(12) United States Patent
Dworzak et al.

(10) Patent No.: US 8,074,562 B2
(45) Date of Patent: Dec. 13, 2011

(54) MOBILE OR PORTABLE APPARATUS WITH PRESSURIZED GAS SUPPLY FOR PREPARING BEVERAGES OR SIMILAR PRODUCTS

(75) Inventors: Christoph Dworzak, Biel (CH); Elmar Mock, Colombier (CH); Andre Klopfenstein, La Neueville (CH); Christoph Rusch, Biel (CH); Naomi Bitmead, Niderwangen b. (CH); Alfred Yoakim, St-Legier-La Chiesaz (CH); Matthieu Ozanne, Paudex (CH)

(73) Assignee: Nestec S.A., Vevey (CH)

( * ) Notice: Subject to any disclaimer, the term of this patent is extended or adjusted under 35 U.S.C. 154(b) by 668 days.

(21) Appl. No.: 12/023,627

(22) Filed: Jan. 31, 2008

(65) Prior Publication Data

US 2008/0121112 A1 May 29, 2008

Related U.S. Application Data

(63) Continuation of application No. 10/595,961, filed on Apr. 27, 2007, now Pat. No. 7,644,649, which is a continuation of application No. PCT/EP2004/013093, filed on Nov. 18, 2004.

(30) Foreign Application Priority Data

Nov. 22, 2003 (EP) .................................. 03026792

(51) Int. Cl.
*A23F 3/00* (2006.01)
*A23L 1/00* (2006.01)
(52) U.S. Cl. ........................ 99/323.1; 99/275
(58) Field of Classification Search ................ 99/323.1, 99/274, 275, 276–323.3; 222/334–372; 417/394; 15/321
See application file for complete search history.

(56) References Cited

U.S. PATENT DOCUMENTS

| 3,209,676 | A | * | 10/1965 | Zimmermann et al. | ..... 99/289 R |
| 4,506,596 | A | * | 3/1985 | Shigenobu et al. | .......... 99/289 T |
| 6,025,000 | A | | 2/2000 | Fond et al. | |
| 6,082,247 | A | | 7/2000 | Beaulicu et al. | |
| 6,123,010 | A | | 9/2000 | Blackstone et al. | |
| 6,666,130 | B2 | * | 12/2003 | Taylor et al. | ..................... 99/305 |
| 7,398,726 | B2 | * | 7/2008 | Streeter et al. | ................... 99/305 |
| 2004/0025702 | A1 | * | 2/2004 | Cutter et al. | .................... 99/279 |

(Continued)

FOREIGN PATENT DOCUMENTS

EP 0512468 11/1992

(Continued)

OTHER PUBLICATIONS

International Search Report for Appl. No. PCT/EP2004/013093 dated Mar. 1, 2005, 3 pages.

(Continued)

*Primary Examiner* — Daniel L Robinson
(74) *Attorney, Agent, or Firm* — K&L Gates LLP

(57) ABSTRACT

Mobile or portable apparatus for preparing beverages comprising a module for delivering a beverage by supplying a pressurized liquid, a liquid feed tank of sufficient capacity for supplying the module with several volumes of liquid for supplying more than one beverage, gas pressurizing means suitable for supplying the module with pressurized liquid, a liquid feed chamber, of which the capacity is several times smaller than the capacity of the tank, said chamber being arranged, in a module feeding configuration, to communicate with the gas pressurizing means in order to pressurize the liquid in the chamber and to inject pressurized liquid into the module and thereby permit the delivery of the liquid through the module.

3 Claims, 4 Drawing Sheets

U.S. PATENT DOCUMENTS

2005/0199130 A1* 9/2005 Palese et al. .................. 99/279

FOREIGN PATENT DOCUMENTS

| | | |
|---|---|---|
| EP | 0512470 | 11/1992 |
| EP | 06012203 | 6/1994 |
| EP | 1686879 | 10/2007 |
| JP | 04-144519 | 5/1992 |
| JP | 06-293391 | 10/1994 |
| JP | 2001-061662 | 3/2001 |
| JP | 2003-052809 | 2/2003 |
| WO | WO8706812 | 11/1987 |
| WO | WO9902081 | 1/1999 |
| WO | WO02080743 | 10/2002 |
| WO | WO9401344 | 11/2006 |

OTHER PUBLICATIONS

Written Opinion of the International Searching Authority for Appl. No. PCT/EP2004/013093 dated Mar. 1, 2005, 6 pages.

* cited by examiner

MOBILE OR PORTABLE APPARATUS WITH PRESSURIZED GAS SUPPLY FOR PREPARING BEVERAGES OR SIMILAR PRODUCTS

CROSS REFERENCE TO RELATED APPLICATIONS

This application is a continuation of U.S. application Ser. No. 10/595,961, filed Apr. 27, 2007, which is a continuation of International Application PCT/EP04/013093 filed Nov. 18, 2004, the content of which is expressly incorporated herein by reference thereto.

BACKGROUND

The present invention relates to an apparatus for preparing beverages or other similar products using a food substance. The invention more precisely relates to dispensing machines, such as mobile or portable coffee machines.

The beverage preparation apparatuses of the coffee machine type which use prepacked or non-packed portions of a food substance are very widespread among private individuals, and also in municipalities, shopping centres and companies. The preparation principle is based on the extraction of portions of the substance by the passage through this substance of a quantity of cold or hot liquid under high pressure, typically a pressure above atmospheric pressure. The prepacked portions can be partially rigid capsules, or else flexible bags, which are hermetically sealed or partially open, or else a dose filter.

An example of a capsule is described in patent EP 0 512 468 B1. An example of a bag is described in patent EP 0 602 203 B1.

Such extraction systems have many advantages. On the one hand, the individual packages are easy to use and require no batching of coffee or other substances, in the machine. The user places a capsule, a ground-coffee dose or other portions in the machine, then presses a button to start extraction. On the other hand, the individual packages are batched to deliver a beverage, like a coffee, having the desired characteristics such as sufficient character, flavour, foam or other important attributes. When they are impermeable, they thus usually preserve the freshness of the substance better, up to the time of extraction. Finally, the preparation conditions, such as the temperature, pressure and extraction time can be better controlled, thereby guaranteeing relatively controlled and constant quality to the consumer.

An example of an extraction method is described in patent EP 0 512 470 B1.

To extract a beverage under pressure from these portions, of the capsule or other type, it is necessary to use a relatively powerful water pump such as an electric compressor. These pumps use the mains electric power supply. They are also rather noisy during extraction.

It is therefore difficult to move these preparation apparatuses, such as on a trolley or simply by carrying them. In fact, it would be an advantage to be able to make these apparatuses more mobile so as to offer beverages in locomotion means such as the train, plane, or in certain places such as cinemas, theatres, and also in public places such as beaches, parks, poolsides and other public or private places.

Patent application WO 99/02081 proposes a coffee machine, more precisely a mobile machine, in which the pressure required to extract the ground coffee is generated by compressed air. The water for preparing the coffee is kept in a thermally insulated container. The water can be heated by electric heating elements. This solution offers the advantage of producing the extraction pressure by a self-contained means, such as a gas cylinder, installed under the machine. The machine can be installed on a trolley with the gas cylinder installed in a compartment of the trolley provided for this purpose.

However, such a device presents certain drawbacks. In fact, in this invention, the gas of the cylinder communicates directly with the hot water tank. This means that the entire volume of the tank is kept under constant pressure, of the order of several bar.

SUMMARY

It is therefore necessary to provide a large capacity tank that withstands the pressure; this undeniably raises problems of design and manufacture, in order to guarantee sufficient safety. If the tank is accidentally fractured, it may explode and cause damage. In case of leakage, water jets can be discharged and cause accidents, such as burns. Moreover, the tank design is limited in the choice of materials, and it cannot use brittle, low specific heat materials, such as glass, for example. Finally, prolonged contact of the gas with a large water reserve under high pressure can also cause the uncontrolled dissolution of the gas in the water; this can therefore alter the taste of the beverage, for example, by making it slightly sparkling or acidulated.

The object of the present invention is therefore to propose an apparatus for preparing beverages which is suitable for a mobile or portable use, while avoiding the drawbacks of the solution of patent application WO 99/02081.

WO 02/080743 relates to a baffle operated liquid heating and dispensing system for a single beverage brewer. Such a system is not configured to be energy autonomous. Therefore, this system cannot practically become portable and/or mobile. In particular, the fluid pressure is provided by an electrically driven air pump which requires the machine to be linked to an external power supply during the extraction.

In particular, one of the objects is to propose an apparatus presenting a sufficient liquid self-sufficiency, but in which only a small volume of liquid is pressurized, so as to reduce the risks and the drawbacks associated with maintaining a large-capacity tank under permanent pressure.

A further object is to propose an apparatus in which the water tank can be manufactured from a choice of more varied and thermally insulating materials.

A further object is to be able to better control the gas exchanges with the liquid, for example, to reduce the risks of impairing the taste of the beverage by the gas. In certain cases, in fact, gasification is undesirable such as, for example, in the production of coffee or hot chocolate.

For this purpose, the invention relates to a mobile or portable apparatus for preparing beverages. It can comprise an extraction module suitable for receiving a portion of food substance for preparing a beverage by supplying a pressurized liquid through said substance. In certain applications, this module can however be replaced by a simple pressurized liquid delivery module. It comprises a self-contained liquid feed tank of sufficient capacity to supply the module with several volumes of liquid for the extraction of more than one portion of substance. It comprises gas pressurizing means suitable for supplying the module with pressurized liquid. Such means are preferably movable gas refilling means which make the gas supply of the apparatus self-contained. They can be a reserve of compressed gas. The gas can be any gas. The apparatus is characterized in that it comprises a liquid feed chamber, of which the capacity is several times smaller than the capacity of the tank. The chamber is arranged, in a filling configuration, to communicate with the tank in order to be filled with liquid. The chamber is also arranged, in a feeding configuration, to communicate with the gas pressurizing means in order to pressurize the liquid in the chamber and to communicate with the extraction module in order to inject pressurized liquid into the module and thereby permit the extraction of the portion of substance. The communication between the gas means and the chamber is provided so that the gas enters into direct contact with the liquid present in the chamber, and so that the tank remains isolated from the pressure with respect to the chamber, that is to say that the liquid present in the tank cannot be subjected to the gas pressure exerted in the chamber.

The apparatus further comprises valve means that are movable in at least two positions to act, in a chamber filling position, to place the chamber in the filling configuration, and in a position for feeding the module by the chamber to permit the extraction of the portion in the extraction module.

It therefore appears from the invention that the tank is no longer necessarily pressurized by the gas pressurizing means, but on the contrary, a feed chamber is provided, of a smaller capacity than that of the tank, to be subject to the gas pressure necessary to partially or completely empty the chamber and to send the pressurized liquid into the extraction module. Thus, a smaller volume, independent of the tank, is pressurized by the gas pressurizing means, thereby making the system safer. Moreover, this smaller volume does not need to be kept at constant pressure thanks to the valve means, which permit switching of the apparatus to the filling position when extraction is terminated. The gas pressure therefore acts on the chamber only when the valve means are actuated to place the chamber in the extraction module feeding position. The pressurizing time is therefore relatively short, thereby reducing the risks associated with the pressurizing of a chamber, and also reducing the gas-liquid contact that is liable to alter the taste of the beverage.

In a preferred mode, the chamber is fed by the tank under the effect of the hydrostatic pressure. For this purpose, the chamber can be positioned at least under half of the tank so as to be supplied with liquid by the tank when the valve means are actuated. More preferably, the chamber is positioned at a level close to the tank bottom, with the opening of the chamber as close to the tank bottom as possible. When actuated, the valve means restore the chamber to atmospheric pressure or to a substantially equivalent pressure. This restoration to substantially atmospheric pressure has the effect of filling the chamber with liquid.

Thus the chamber is easily filled without the need for a pump and without external energy input. During its filling with liquid, the chamber is at low pressure hence without danger. Once filled, the chamber remains at the same pressure until the time when the module must be fed to extract a beverage. It is therefore understandable that most of the time, the chamber is maintained at low filling pressure, thereby reducing the risks associated with high pressure and also reducing the contact time with the gas.

In a preferred embodiment, the chamber is connected to the tank by a liquid inlet actuated by a one-way valve; said valve is thus opened during filling by the hydrostatic effect of the thrust of the liquid from the tank to the chamber, and is kept closed by the thrust of the liquid present in the feed chamber under the pressure exerted by the gas. Such a valve is of simple design and particularly effective for maintaining the separation between the chamber and the tank in the module feeding position; that is to say when the gas is introduced into the chamber, so that the tank is not subjected to the internal pressure of the chamber due to the gas injected therein. For example, such a valve can consist of a movable needle or ball, or any other equivalent means, disposed inside the chamber and opposite an opening of the chamber which communicates with the tank. In one possible alternative, the valve could be an electromechanical valve.

The chamber is preferably made of pressure-resistant and impact-resistant material(s), such as metals and/or plastics. The chamber is therefore a more easily safeguarded portion and, due to its smaller volume compared with the volume of the tank, it is easier to protect in the apparatus.

In a preferred embodiment, the tank is an assembly comprising thermally insulating walls. It further comprises a removable lid or plug for easy filling. This makes it possible to maintain a liquid for a certain time interval at a temperature necessary for the extraction of the beverage. The liquid can thereby be kept at a temperature of between 60 and 95° C. for several minutes. The liquid can be poured hot or boiling into the tank and/or be heated in the tank by heating means. The insulating walls preferably comprise at least one internal wall made of low specific heat material and at least one insulation layer surrounding the internal wall. This can, for example, be walls of the "thermos" type typically comprising at least one internal wall of glass or metal and at least one insulation layer. More preferably, the walls are a double wall of glass or metal separated by an insulation layer formed by a gas, or a partial or total vacuum, with or without foam.

In a preferred configuration, the chamber is thus located actually inside the tank. In this case, the chamber is protected by the tank, and the liquid in the tank surrounding the chamber, which is at a lower pressure than the pressure of the chamber. Such a configuration tends to simplify the device because the chamber can communicate with the tank by a single opening.

Preferably, the chamber is placed at the bottom of the tank with its filling opening as low as possible in the tank.

Such a configuration also tends to make the apparatus more compact. Finally, when the tank contains a hot liquid and is therefore thermally insulated, the energy losses are smaller in the tank and/or the chamber, because of the heat transfers made possible between the two containers.

When the chamber is located inside the tank, the chamber is preferably isolated from impacts with respect to the tank walls. For this purpose, the chamber can be connected by one or more elements to the lid or plug of the tank. The chamber can be formed of a tough and durable material such as plastic or metal. The chamber can also be connected to the tank walls by damping means such as elastomer or other buffers. Isolating the chamber from impacts has the advantage of limiting the risk of bursting when the chamber is pressurized, and also that the tank walls can be made of any suitable material, including a fragile material, such as a brittle, fissurable and/or perforable material.

In a further configuration, the chamber is positioned outside the tank. This configuration has the advantage of heating the liquid outside the tank, that is to say, for example, either heating the liquid in the chamber, or heating it between the chamber and the extraction module. The tank therefore needs no insulation and can contain an unheated liquid. The apparatus can be relieved of the need to use electricity by providing non-electric heating means such as combustion heating means, such as a burner, these being placed so as to heat the chamber and/or a portion of the line between the chamber and the extraction module. The apparatus can thereby operate without an electric power supply.

Preferably, the valve means comprise a two-way valve that can be manually or electrically actuated. Such a valve can be, for example, a solenoid valve or a rotary valve of the three-way type, for example, or any equivalent means. In general, the valve can be actuated manually or by an electrical signal.

The lid or plug of the tank can be integral with a bearing structure which supports the various essential components of the apparatus including the lines that communicate with the feed chamber. The main lines are the gas supply line, the tube for venting the chamber to atmospheric pressure, and the feed line from the chamber to the extraction module. An air inlet line in the tank is also useful.

For example, the bearing structure can thereby receive the extraction module. It is also arranged to receive the connecting device to the gas reserve. It can house the valve means and its manual (such as a lever) or electrical (push buttons) control means. It can also comprise various electrical connections and/or monitoring and control elements.

The bearing structure can integrate or be combined with transport means such as a handle, straps, a harness and/or alternatively castors, a rolling tray or stretcher trolley, etc, so as to make it easier to carry and/or roll the apparatus.

Preferably, the gas pressurizing means must be able to deliver a gas supply pressure between 2 and 25 bar, preferably between 5 and 20 bar. This pressure is necessary to empty the chamber partially or completely, to transport the liquid through the feed line to the extraction module, and to extract the beverage through the food substance at a sufficient extraction pressure taking account of the pressure drop in the circuit.

The feed pressure is preferably controlled by a pressure control member such as a pressure reducer tarred to the feed pressure. The gas flow can also be controlled independently by a restriction in order to permit a progressive pressure buildup in the extraction module. Under certain circumstances, this restriction is necessary to prevent an excessively abrupt pressure rise when the valve means are open. An excessively abrupt pressure rise could prematurely open, tear or burst the package of the portion of substance.

The gas used can be compressed air, $CO_2$, $N_2O$, $N_2$, $O_2$, argon or a mixture thereof, and/or any other type of appropriate gas. The gas reserve is preferably a cylinder or an reinforced tank with a capacity between 0.1 and 20 litres, preferably between 0.5 and 5 litres.

The apparatus according to the invention further preferably comprises means for heating the liquid before its introduction into the extraction module. These means can be disposed to heat the tank and/or the chamber and/or the feed line between the chamber and the extraction module. Such means are not however indispensable, but may prove to be important for heating the liquid from a given temperature or simply for compensating for the heat losses of the liquid when it is introduced hot or boiling into the tank.

The heating means can be electrical means of the resistive type or a thermo block or means of the burner type using a solid and/or gaseous and/or liquid fuel. For example, the heating means can be an electrical resistance resistor or element placed inside, against or even partially or totally surrounding the feed chamber and/or inside, against, or even partially or totally surrounding the feed line conveying the liquid to the extraction module. The electrical resistance element(s) may be of any type such as a metal resistance element, a ceramic cartridge heater or even resistive printed circuits on an electrically insulating structure.

The apparatus preferably comprises built-in electric power supply means which are provided to supply the electrical heating means, if any. These electric power supply means can comprise at least one electric battery. Such a battery can be rechargeable of the electric or solar or combined electric/solar recharge type. It can also be a battery such as a replaceable but non-rechargeable electric battery. If it is rechargeable, the battery can be mounted so as to make it detachable or not from the apparatus. If it is not detachable, the battery is preferably rechargeable by connection, via appropriate connecting elements, to a recharge station that comprises an electric transformer connectable to the mains. Such a recharge station can be provided as a base on which the apparatus rests to recharge the battery outside service periods.

According to another embodiment, the electrical connecting means are provided in order to supply the heating means periodically during connection of the electrical connecting means to an external electric power supply source. For example, these electrical connecting means comprise a mains AC electrical connector and/or and an electric power connector for the connection to a mobile or fixed power supply of the cigarette lighter type and/or an electrical terminal or substation delivering low-voltage power.

In another aspect of the invention, the apparatus of the invention comprises:
a module for delivering a beverage by supplying a pressurized liquid,
a liquid feed tank of sufficient capacity for supplying the module with several volumes of liquid for repeatedly supplying more than one beverage,
pressurizing means suitable for supplying the module with pressurized liquid,
a liquid feed chamber, of which the capacity is several times smaller than the capacity of the tank;
said chamber being arranged, in a filling configuration, to communicate with the tank in order to be filled with liquid and,
said chamber being arranged, in a module feeding configuration, to communicate with the pressurizing means in order to pressurize the liquid in the chamber and to inject pressurized liquid into the module and thereby permit delivery of the liquid through the module,
characterized in that the apparatus is configured to be mobile or portable for service by being free of an electrical connection to an electrical power supply outlet during service,
wherein the pressurizing means is non-electrical and comprises at least one autonomous reserve of pressurized gas, and
wherein the tank comprises heat insulated walls to reduce the liquid heat loss during transport.

The invention further relates to a method for delivering a pressurized liquid in a mobile or portable beverage distribution apparatus comprising: providing a liquid feed chamber which is filled by the effect of the difference of pressure between the chamber and a feed tank of the apparatus having a larger liquid capacity than that of the chamber and which chamber is emptied after filling the chamber under the pressure of a gas supplied from an autonomous gas reserve of the apparatus; said gas entering in the chamber to pressurize the chamber while the chamber is tight to the feed tank so that the feed tank is free of the pressure of gas.

Preferably, the liquid feed chamber is filled by the effect of the hydrostatic pressure between the chamber and the tank. A one-way valve can be used to feed the chamber with the liquid coming from the tank.

In the method of the invention, before transport, the tank is filled with a liquid at a temperature above ambient temperature or is heated in the tank at a temperature above ambient temperature and the tank is heat insulated to compensate for the heat loss during transport. The liquid must be filled in the tank or heated at a temperature of at least 90° C. in order to provide a sufficient temperature of extraction of the ingredients to form the beverage.

"Portion" of food substance means a prepacked or non-packed portion. A prepacked portion can be a dose of food substance in a container such as a cartridge, bag, or other appropriate packaging modes. A non-packed portion can be a dose of food substance, such as ground coffee, directly introduced into the chamber of the extraction module.

"Liquid" means water or a food liquid, according to the applications.

"Electrical power supply outlet" means a household or industrial electrical power supply typically providing 110, 220-230 or 380-Volt electricity.

Additional features and advantages are described herein, and will be apparent from, the following Detailed Description and the figures.

DETAILED DESCRIPTION

Figure 1:
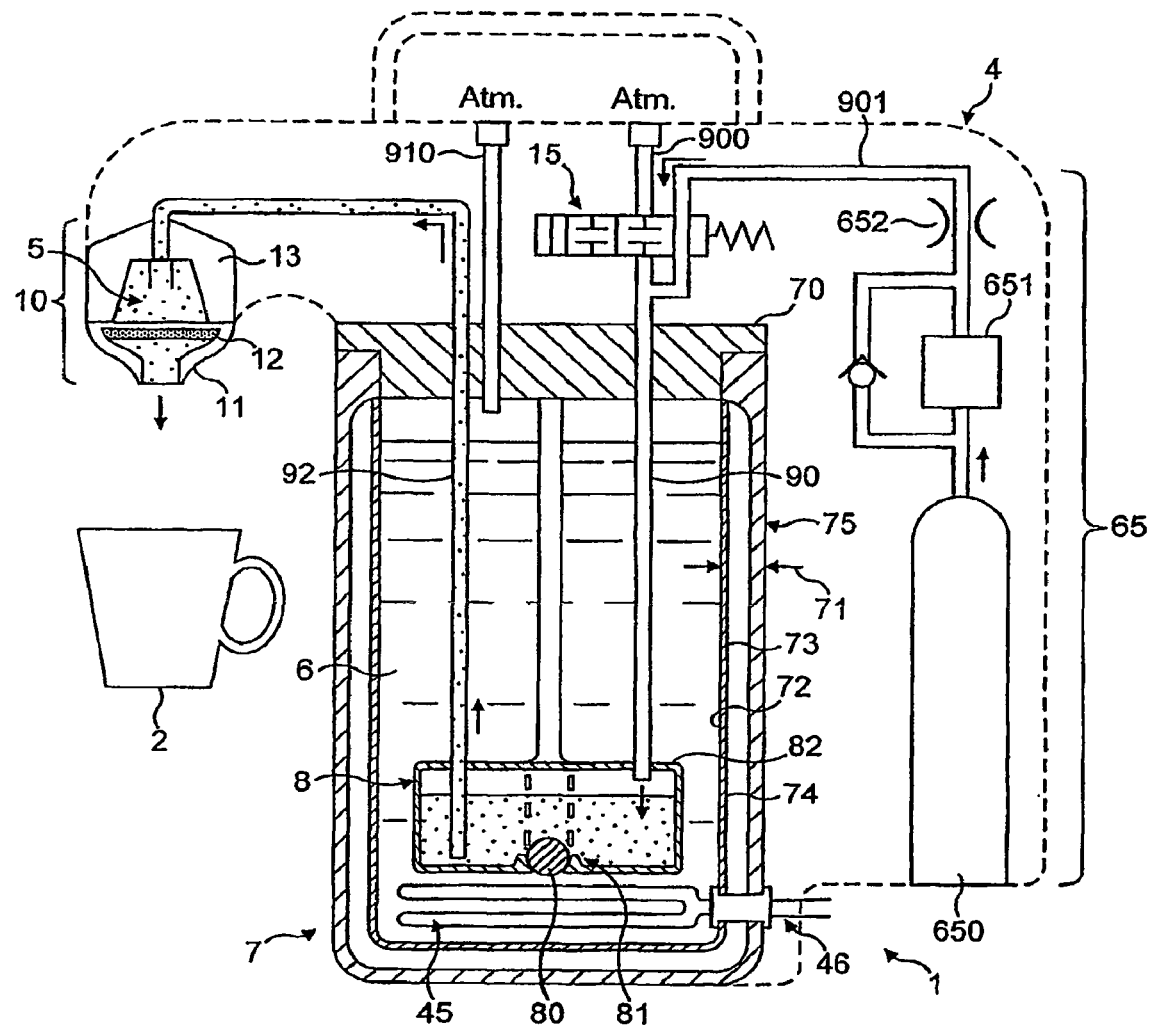
FIG. 1 shows a schematic cross-sectional view of an apparatus according to the invention in a gas pressurizing configuration of the chamber and hence of the extraction module.

The device according to the invention is an apparatus 1 capable of delivering hot or cold beverages by extraction under the pressure of a substance contained in a prepacked portion 5 of the capsule or bag type. A pressurized liquid, typically water, is sent through the substance and the beverage thereby extracted is collected in a receptacle such as a cup 2. The device of the invention hence comprises an extraction module 10 arranged in order to receive one or more particular types of portions 5. The module generally comprises a capsule support 11, possibly means 12 for opening the capsule acting under the effect of the pressure inside the capsule to release the extract at a given extraction pressure, means for spraying or injecting 13 liquid into the capsule such as a capsule cage comprising needles or blades to open the capsule combined with one or more orifices for injecting the liquid.

The module normally comprises closure means for firmly maintaining the capsule. These closure means can comprise hinged means 11,12 in the form of jaws that can be opened/closed by actuating elements by means of a lever (not shown).

The module can be part of a bearing structure body 4 which combines the essential components of the apparatus thereby forming, with the remainder of the apparatus, a compact and easily mobile and/or portable assembly.

In a preferred construction a liquid tank 7 can be part of the bearing structure 4. The tank 7 has a capacity adapted to the needs of the apparatus and to its use; the principle being that the apparatus can deliver a sufficient number of beverages during service. The tank 7 is therefore designed to supply the extraction module 10 in a self-contained manner, that is to say without continuous input of water from a source extraneous to the apparatus. The tank comprises a body delimiting a vessel 6 which is closed by a lid or plug 70 that is adapted by any removable connecting means to the tank body, such as by clipping, screwing or other.

Preferably, the tank vessel is isolated from the external environment by insulating walls 71. These walls can form a virtually adiabatic insulating assembly commonly known as a "thermos flasks". This name can include a large number of possible insulation configurations. The most common are the combination of at least one internal layer 72 of a low specific heat material such as glass or metal (copper, aluminium, steel, etc.) and at least one thermally insulating layer 73 surrounding the internal layer. An insulating layer can be a gas such as air or argon, vacuum or a foam-based or fibre-based material. An efficient thermal insulation assembly will more preferably comprise at least two layers of glass or metal 72, 74 separated by an insulating layer 73, preferably of vacuum or of gas.

The tank 7 of the apparatus further comprises an impact-resistant envelope 75 such as a plastic moulded part surrounding the tank insulation assembly. The part 75 can constitute a one-piece part of the tank body or a part added to others to form the exterior of the tank 7.

According to an essential aspect of the invention, a feed chamber 8 is provided which separates the tank 7 from the module 10. The chamber 8 is connected to the module 10 via a feed line 92. This line communicates freely in the chamber. The feed chamber 8, in the example in FIG. 1, is positioned inside the tank 7. The chamber is located in the bottom half of the tank, preferably in the bottom of the tank, and comprises an opening 80 able to communicate with the tank. The opening is oriented towards the bottom of the chamber, preferably at the very bottom of the chamber 8. This opening 80 is selectively restricted by a one-way type valve 81 comprising a ball or a needle and a ball seating and retaining means. The ball or needle is positioned inside the chamber in order to cause closure from the interior under the effect of an internal pressure in the chamber and so as to cause opening by the effect of a pressure external to the chamber.

The tightness between the ball or the needle can be improved by an annular seal or other equivalent element, which cooperates with the element around the opening.

According to the positioning of the chamber 8 and of its opening 80 under the average chamber filling level, the chamber is intended to be filled by the sole effect of the hydrostatic pressure in the tank vessel 6. The filling is achieved by the pushing of the one-way valve 81 by the fluid present in the tank.

The volume of the chamber 8 may vary as required. The volume can serve to extract at least one portion of substance (a capsule or bag or else a non-packed dose). It can reach several portions such as two, three, or even four successive portions. For example, the chamber may have a volume between 40 ml and 500 ml. Preferably, the chamber will have a volume of about 110 ml; this corresponds to the capacity of a large cup of coffee, tea, or hot chocolate.

The feed chamber 8 communicates selectively, via the gas conveyance means 90, 901 with the gas pressurizing means 65. These means preferably comprise a gas refill 650 in the form of a cylinder or other, associated with a pressure regulator 651 at the outlet of the refill, such as a pressure reducer. A gas flow regulating means such as a restriction 652 is also preferably provided on the feed between the pressure reducer and the chamber in order to regulate a progressive pressure rise of the liquid in the extraction module 10. The conveyance means 90 terminates in the chamber at any appropriate place, such as on the top 82 of the chamber.

The main line 90 is separated by a valve 15 which can be positioned between the chamber 8 and the gas pressurizing means 65.

The tank is connected to the exterior via an air intake line 910, allowing the replacement of the volume lost in the tank by air, due to the filling of the chamber with liquid.

The valve 15 acts according to a two-way movement principle. In a first position according to FIG. 2, the valve connects the feed chamber 8 to a line 900 open to atmospheric pressure. In a second position, the valve 15 connects the chamber 8 to the gas feed line 901.

Figure 2:
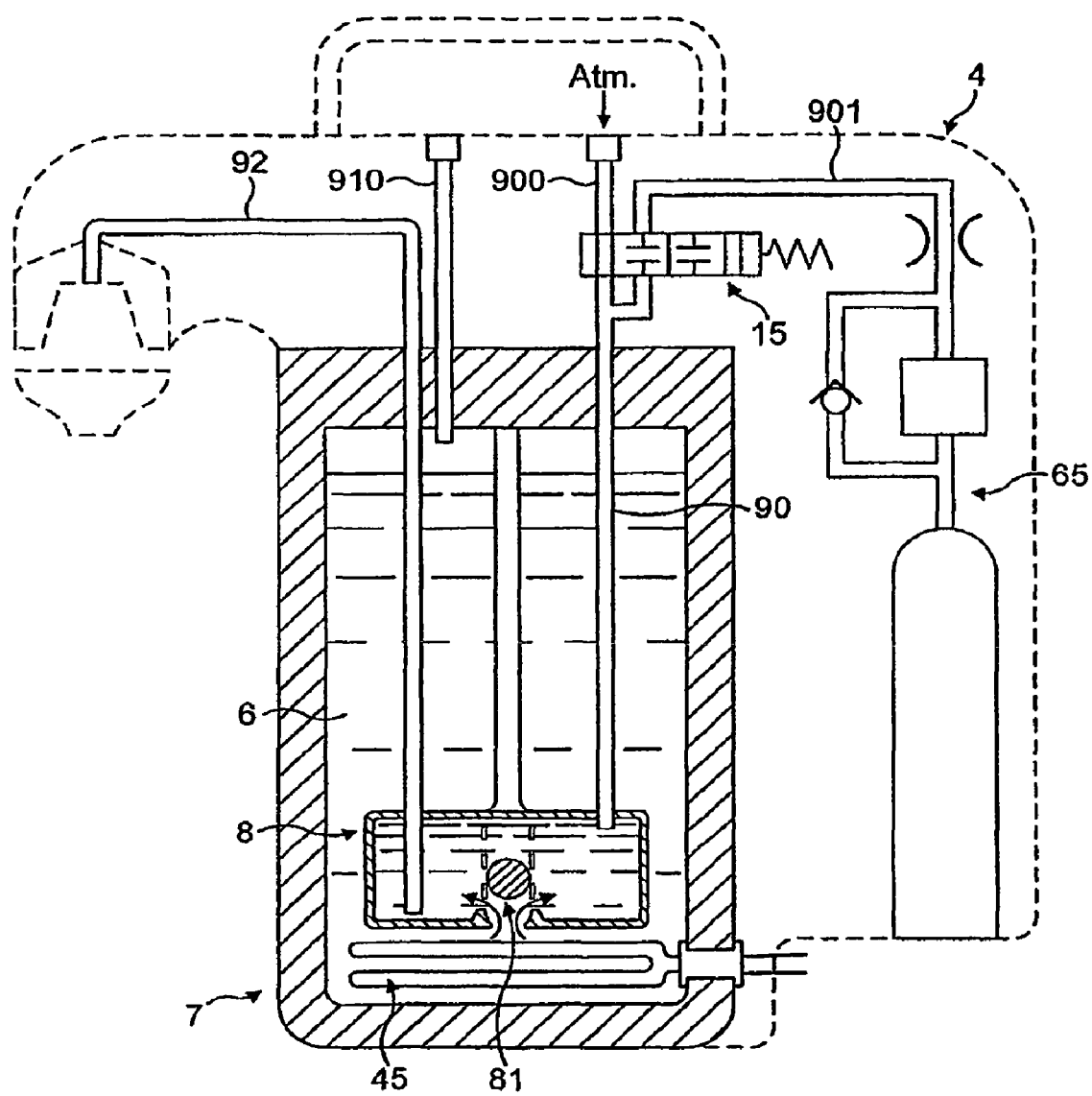
FIG. 2 shows a schematic cross-sectional view of the apparatus of FIG. 1 in a chamber filling configuration.

Such a valve 15 can be actuated manually such as by a lever, a push-button or other equivalent element. It can also be actuated by electrical pulse (solenoid valve). In this case the valve 15 remains in the equilibrium position in the chamber at atmospheric pressure or "rest position" in the absence of a pulse (FIG. 2). During an electrical pulse on the valve, the solenoid valve is switched to the position for supplying the chamber with gas (FIG. 1). The return of the solenoid valve to the filling position (FIG. 2) is then actuated by a timer or by the measurement of a pressure drop in the circuit below a certain threshold or by any other appropriate measurement and monitoring means.

Heating means 45 can be provided to heat the water before it enters the extraction module 10. Such heating means may, for example, be at least one resistance heating element which surrounds the chamber in order to heat it. These heating means can also surround the feed line 92 or else be placed inside the line. The resistances can be replaced by any equivalent heating means. These means are connected to an electric power supply 46.

The apparatus according to the invention operates according to the following principle:

In the filling position, which corresponds to FIG. 2, the valve 15 is in the open position. The chamber 8 is then constantly in equilibrium at atmospheric pressure. When the chamber is partially or completely emptied after extraction, considering that the tank contains a sufficient level of water, the hydrostatic pressure of the liquid in the tank pushes the mobile element of the one-way valve 81 into the chamber. This enables the water from the tank to completely fill the chamber. When the water level of the tank is lower above the chamber, filling partially occurs up to the tank level. However, the vessel of the tank 7 can be placed under slight overpressure by adding pressurized gas in order to continue supplying the chamber when the water in the tank has reached a lower level. Gas can be added by means of gas from the available gas refill, a gas overflow discharged by the chamber when it is filled, or by pumping air into the tank by means of a hand-operated or electric pump.

When the feed chamber 8 is full, the apparatus is again operational for extracting a beverage.

To prepare a beverage such as coffee, the user therefore inserts a portion of coffee 5 into the extraction module 10. The module is closed around the portion.

The user then actuates a control means (not shown) to move the valve into the feed position. The main line 90 then communicates with the gas inlet line 901, which places the chamber under pressure and then closes the one-way valve (FIG. 1).

As the gas continues to enter, controlled by the restriction 652, the chamber progressively rises in pressure and the liquid in the chamber is discharged into the feed line 92 and into the extraction module. The pressurized water is then forced through the portion of coffee to extract the coffee. The capsule opens under the effect of the extraction pressure, and the liquid extract then flows through the portion and into the cup.

The flow of liquid extract stops either when the chamber is completely emptied, allowing only gas to escape, or when the valve 15 is returned to the closed position corresponding to FIG. 1. This closure can be carried out manually or automatically.

During restoration to atmospheric pressure, the chamber is again filled with water (FIG. 2). The apparatus is then ready to extract the next beverage.

Figure 3:
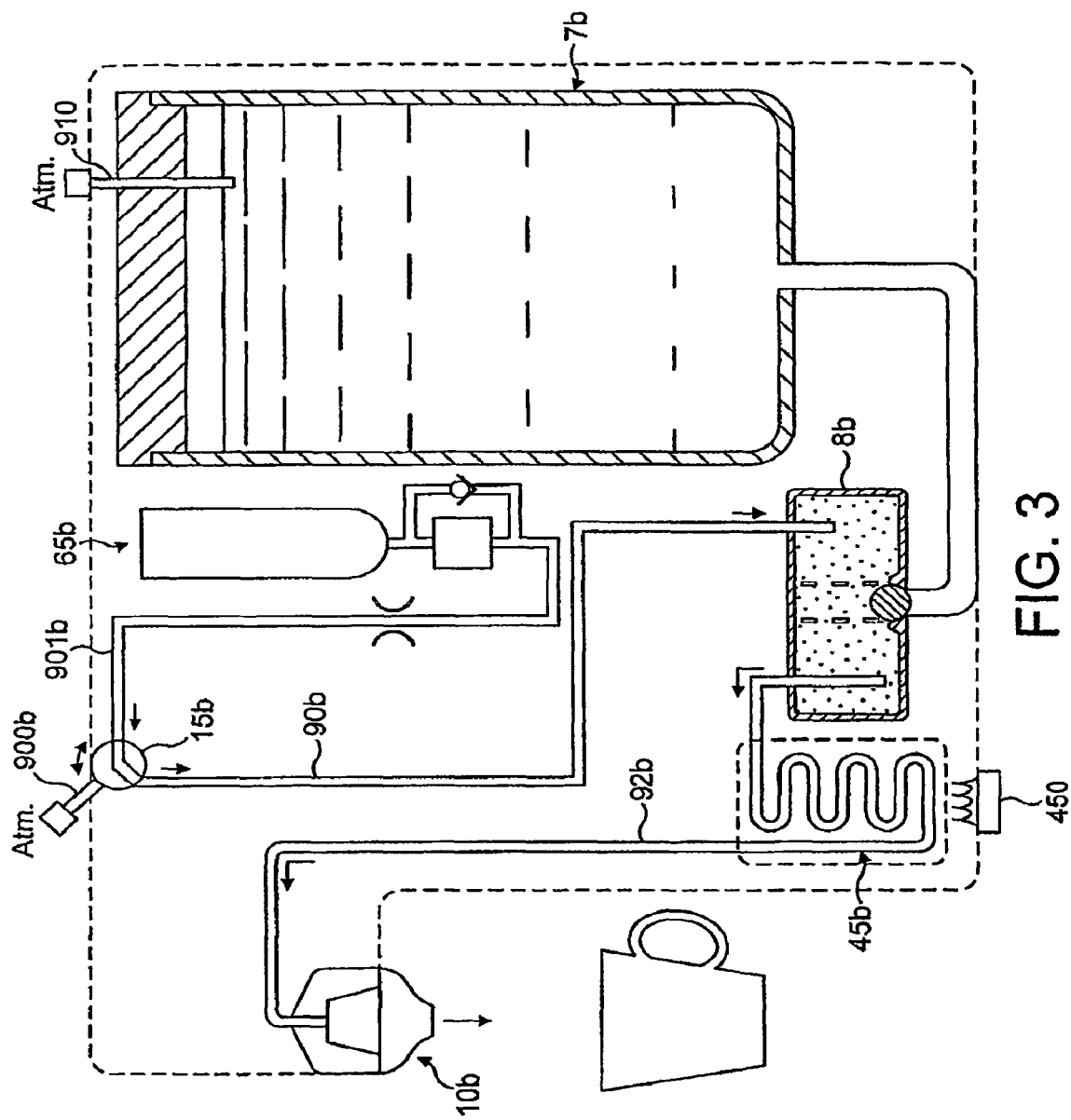
FIG. 3 shows a variant of the apparatus in which the chamber is positioned outside the water tank.

FIG. 3 shows an embodiment in which the chamber is outside the tank and the heating means are positioned between the chamber and the extraction module.

More precisely, the apparatus in FIG. 3 comprises a tank 7$b$ containing unheated water. The tank communicates with a feed chamber 8$b$ positioned outside the tank and preferably at a level below the tank, in order to fill the chamber by gravity until the tank is completely emptied.

The chamber communicates with the gas pressurizing means 65$b$ via the lines 90$b$, 901$b$ which are separated by a valve 15$b$. The valve 15$b$ can be a three-way valve. Rotation of the valve 15$b$, manually or electrically actuated, makes it possible to bring the lines 90$b$, 901$b$ into communication with each other in the chamber pressurizing position and to bring the lines 90$b$, 900$b$ into communication with each other in the chamber filling and pressure-rebalancing position.

Pressurizing the chamber has the effect of emptying the chamber 8$b$ and sending the pressurized liquid through the feed line 92$b$ to the extraction module 10$b$. A heating means 45$b$ is provided, which can be a burner, for example, mounted along the line 92$b$ to heat the liquid to the extraction temperature. The burner comprises combustion means 450 of the solid, liquid, or gaseous type. Depending on the type of gas of the gas means, this gas can serve to supply the burner by bypassed feeding means and via a specific pressure reducer.

Such a device has the advantage of being of self-contained in terms of energy, that is to say it can be moved without the need for connection to an external energy source.

Figure 4:
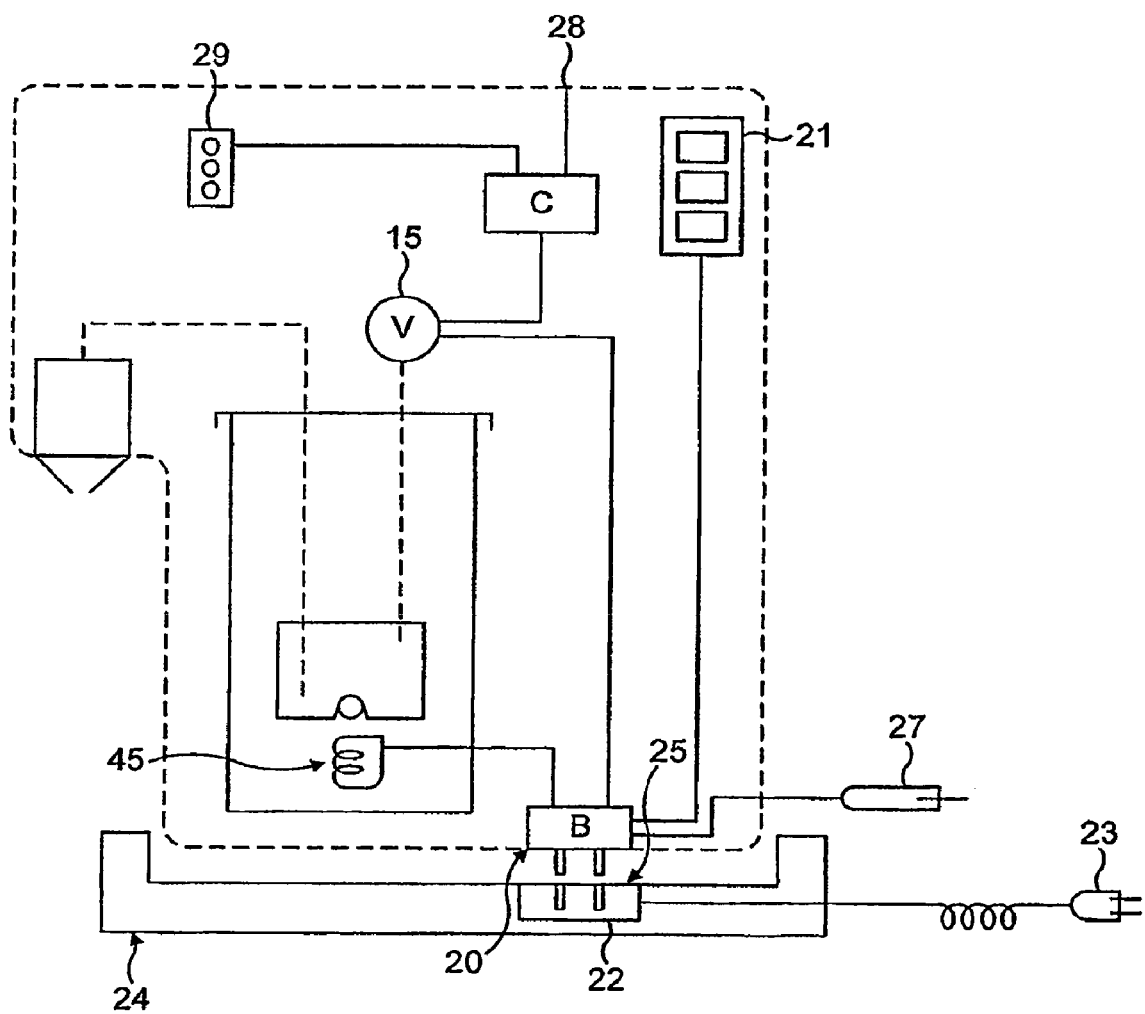
FIG. 4 shows a schematic view of the electric power supply of the apparatus according to the invention.

FIG. 4 shows schematically an example of electric power supply of the apparatus according to the invention in a portable or mobile configuration.

For example, the apparatus can comprise a built-in electric power supply means in the bearing structure, such as a battery 20. The battery is electrically connected to the liquid heating means 45. It can also supply a complex electrical circuit comprising the solenoid valve 15, a controller 28 associated with a control panel 29, monitoring diodes, timers, etc.

Depending on the heating method, the volume of water to be heated and the insulation conditions, the energy needed to heat several beverages in succession may vary. However, on average, the battery is selected so as to have an electric power storage capacity of at least 50 000 joules, preferably between 100 000 and 1 000 000 joules.

The electric power supply of the battery can be provided by solar electrical energy or by periodic or permanent connection to the mains.

In a solar energy configuration, a solar panel element 21 is placed on the apparatus which converts the solar energy to electrical energy in order to supply the battery 20. The element 21 can be an auxiliary or main element depending on the uses. In a mains electrical energy configuration, the battery is connected to a low-voltage electric transformer 22 connectable to the mains by a connection 23. Preferably, a recharge station or base 24 is provided to receive the apparatus in a recharge configuration during which the battery 20 is directly connected to the transformer 22 by appropriate connecting means 25. Other electric power supply means can be provided as auxiliary or main means, depending on the needs and uses, such as a power supply cable of the cigarette lighter type 27 or any other standard or specific electrical connection.

The invention can apply to other beverage distribution apparatuses like those using non-packed food portions such as those used in a conventional espresso machine. Its principle can also be extended to other types of beverage distribution apparatus such as a beer tap, for example. In this case, the extraction module can be replaced by a simple pressurized liquid distribution module such as, for example, a distribution nozzle or a fountain with a manually or electrically controlled valve. The number of modules is not critical and several modules can equip an apparatus, particularly if it is desired to dispense more than one beverage at the same time.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed as follows:

1. An apparatus for preparing beverages, the apparatus comprising:
    a module for delivering a beverage by supplying a pressurized liquid;
    pressurizing means suitable for supplying the module with pressurized liquid;
    heating means for heating the liquid supplied to the module, the heating means comprising a combustion heating means; and
    an electric energy supply supplied by an energy source selected from the group consisting of a battery, a solar electric energy supply and combinations thereof.

2. An apparatus for preparing beverages, the apparatus comprising:
    a module for delivering a beverage by supplying a pressurized liquid;
    pressurizing means suitable for supplying the module with pressurized liquid;
    heating means for heating the liquid supplied to the module, the heating means comprising a combustion heating means; and
    a liquid feed chamber, of which the capacity is several times smaller than the capacity of a liquid feed tank, the chamber being arranged, in a filling configuration, to communicate with the tank in order to be filled with liquid, the chamber being arranged, in a module feeding configuration, to communicate with the pressurizing means in order to pressurize the liquid in the chamber and to inject pressurized liquid into the module and thereby permit delivery of the liquid through the module,
    wherein the pressurizing means comprises at least one autonomous reserve of pressurized gas, and
    wherein in the module feeding configuration, the gas enters into direct contact with the liquid present in the chamber while the tank remains isolated from the pressure with respect to the chamber, so that the liquid present in the tank is not subjected to the gas pressure exerted in the chamber.

3. The apparatus of claim 2, wherein the combustion heating means comprises a burner, the gas pressuring means being arranged to supply the burner with gas by bypassed feeding means and via a pressure reducer.

* * * * *